United States Patent [19]

Kim et al.

[11] Patent Number: 5,597,769

[45] Date of Patent: Jan. 28, 1997

[54] DIELECTRIC CERAMIC COMPOSITION FOR BOUNDARY LAYER CONDENSERS AND A METHOD FOR PREPARING THE SAME

[75] Inventors: Yoon H. Kim; In-Kyu Yoo; Jae-Dong Byun, all of Seoul, Rep. of Korea

[73] Assignee: Korea Institute of Science and Technology, Seoul, Rep. of Korea

[21] Appl. No.: 423,496

[22] Filed: Apr. 19, 1995

[30] Foreign Application Priority Data

Apr. 20, 1994 [KR] Rep. of Korea .................. 8362/1994

[51] Int. Cl.$^6$ .................. C04B 35/46; C03C 14/00
[52] U.S. Cl. .................. 501/136; 501/21; 501/38
[58] Field of Search .................. 501/21, 38, 136

[56] References Cited

U.S. PATENT DOCUMENTS

| | | | |
|---|---|---|---|
| 4,388,416 | 6/1983 | Sakabe et al. | 501/136 |
| 4,405,479 | 9/1983 | Murase et al. | 501/136 |
| 4,900,702 | 2/1990 | Tduboi et al. | 501/136 |
| 4,978,646 | 12/1990 | Bardham et al. | 501/136 |

FOREIGN PATENT DOCUMENTS

| | | | |
|---|---|---|---|
| 0032600 | 3/1977 | Japan | 501/136 |
| 0032599 | 3/1977 | Japan | 501/136 |
| 405298920 | 11/1993 | Japan | 501/136 |

OTHER PUBLICATIONS

Kenton Derek Budd, "Procssing and Properties of Tungsten-—Doped Strontium Titanate Ceramics", Thesis, Univ. of Ill. at Urbana–Champagne, 1981 (No Month).

Mehrotra, Arun Kumar, "Microstructure and Dielectric Behavior for Pure and Bismuth Doped Strontium —Titanate Polycrystalline, " Univ. of Ill. at Urbana–Champagne, 1982 No Month.

*Primary Examiner*—Deborah Jones
*Attorney, Agent, or Firm*—Lowe, Price, LeBlanc & Becker

[57] ABSTRACT

A dielectric ceramic composition having an empirical formula represented by $(Sr_{1-2x}Bi_xTi_{1-y}W_y)O_3$ wherein x is in a range of 0.0005 to 0.003 and y is in a range of 0.0015 to 0.009 for boundary layer condensers and a method for preparing the same which are comprising the steps of: mixing $Bi_2O_3$-$WO_3$ frit powder with main component having an empirical formula represented by $Sr_{1-2x}Ti_{1-y}O_3$ wherein x is in a range of 0.0005 to 0.003 and y is in a range of 0.0015 to 0.009, in a wet manner, the $Bi_2O_3$ frit serving as a reducing agent; drying the resulting mixture; sintering the dried mixture at a temperature of 1,400 to 1,470° C under a reducing atmosphere; and applying secondary thermal treatment to the sintered body at 1,250° C are disclosed.

3 Claims, No Drawings

DIELECTRIC CERAMIC COMPOSITION FOR BOUNDARY LAYER CONDENSERS AND A METHOD FOR PREPARING THE SAME

BACKGROUND OF THE INVENTION

1. Field of the Invention

The present invention relates, in general, to a ceramic condenser composition and, more particularly, to a dielectric ceramic composition for boundary layer condensers, improved in both dielectric properties and insulation resistance properties. The present invention also relates to a method for preparing the same.

2. Description of the Prior Art

Generally, a boundary layer condenser is manufactured through very intricate procedures, including various formulations and processes. In particular, conventional manufacturing procedures and compositions for improving dielectric properties are very diverse.

A boundary layer condenser is required to exhibit a superior dielectric constant, low dielectric loss and superior insulation resistance. Research and development efforts have been directed to improve each of these properties without deleteriously affecting the others, as well as to improve two or three properties simultaneously. However, a dielectric ceramic composition satisfying these properties has not yet been reported.

In dielectric ceramic compositions comprising $SrTiO_3$, generally $WO_3$ and $Bi_2O_3$ are used as dopants to make $SrTiO_3$ semiconductive. If $SrTiO_3$ is subjected to solid phase sintering, large stresses are induced. Accordingly, it is preferred to sinter such dielectric ceramic compositions in a liquid phase. However, since $WO_3$ has a melting point greater or equal to 1,470° C, it is not liquified when $SrTiO_3$ is sintered, which deleteriously affects the resulting product. $Bi_2O_3$ has a melting point of about 825° C, so that it forms a liquid phase when $SrTiO_3$ is sintered. However, $Bi_2O_3$ does not sufficiently reduce $SrTiO_3$. Kenton Derek Budd, "Processing and properties of tungsten-doped strontium titanate ceramics" Master Thesis, Univ. of Illinois at Urbana-Champaign, 1981; A.K. Mehrotra, "Microstructure and Dielectric Behavior for Pure and Bismuth-doped $SrTiO_3$ Polycrystalline Ceramics" PH.D. Thesis, Univ. of Illinois at Urbana-Champaign, 1982.

SUMMARY OF THE INVENTION

It is an object of the present invention to provide a dielectric ceramic composition for boundary layer condensers which is superior in both dielectric properties and insulation resistance.

It is another object of the present invention to provide a novel method for the preparation of a dielectric ceramic composition, capable of enhancing the liquid phase sintering of $SrTiO_3$, thereby improving both its dielectric properties and insulation resistance.

Based on intensive and thorough studies by the present inventors, the above objects are accomplished by providing a dielectric ceramic composition for boundary layer condensers having an empirical formula represented by $(Sr_{1-2x}Bi_xTi_{1-y}W_y)O_3$, wherein x ranges from 0.0005 to 0.003 and y ranges from 0.0015 to 0.009. The present invention also comprises a method for the preparation of a dielectric ceramic composition, which method comprises the steps of: mixing $Bi_2O_3$-$WO_3$ frit powder in a slurry with the main component having an empirical formula represented by $Sr_{1-2x}Ti_{1-y}O_3$, wherein x ranges from 0.0005 to 0.003 and y ranges from 0.0015 to 0.009; drying the resulting mixture; sintering the dried mixture at a temperature of 1,400 to 1,470° C under a reducing atmosphere; and applying secondary thermal treatment to the sintered body at 1,250° C.

These and other objects and advantages of the present invention will become more apparent from the following detailed description.

DETAILED DESCRIPTION OF THE INVENTION

In accordance with the present invention, a dielectric ceramic composition for boundary layer condensers represented by the following empirical formula is provided:

$$(Sr_{1-2x}Bi_xTi_{1-y}W_y)O_3,$$

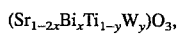

wherein x ranges from 0.0005 to 0.003; and y ranges from 0.0015 to 0.009.

The present invention also comprises a method for preparing the dielectric ceramic composition.

Initially, highly pure, powdery strontium carbonate ($SrCO_3$), titanium oxide ($TiO_2$) and $Bi_2O_3$-$WO_3$ frit are provided in amounts satisfying the above composition ratio. The $Bi_2O_3$-$WO_3$ frit is well mixed with $SrCO_3$ and $TiO_2$, and water to provide a slurry.

Subsequently, the slurry is dried to produce a fine powder which is molded into a predetermined shape. The molded article is then sintered at a temperature of 1,400 to 1,470° C. Sintering is carried out in a reducing atmosphere consisting of hydrogen and nitrogen. After sintering, a secondary thermal treatment is applied to the sintered body to obtain a dielectric boundary layer condenser.

In accordance with the present invention, $WO_3$ and $Bi_2O_3$ are added as frit to enable liquid phase sintering of $SrTiO_3$. The frit is formed by mixing $WO_3$ with $Bi_2O_3$ in a proper mole ratio, and melting the mixture to form the frit. $Bi_2O_3$ is mixed with $WO_3$ in a mole ratio of the former to the latter of about 1:3 to form a mixture. The mixture is then heated to the molten state, for example at 900° C for 10 minutes, and thereafter rapidly cooled to form a glass, which is subsequently finely pulverized to form a $Bi_2O_2$-$WO_3$ frit, the reducing agent.

The dielectric ceramic composition prepared by the method of the present invention exhibits a dielectric constant of 60,000 at 1 KHz and a dielectric loss less than 0.5%. In addition, the dielectric ceramic composition according to the present invention also shows an insulation specific resistance of at least $1 \times 10^{10}$ Ω-cm when DC 25V is applied for 30 seconds.

The preferred embodiments of the present invention will now be further described with reference to the following specific examples.

EXAMPLE 1

Preparation of $Bi_2O_3$-$WO_3$ Frit

Powdery $Bi_2O_3$ and $Wo_3$, each having a purity of greater than 99%, were mixed in a mole ratio of 1:3, and then melted at 900° C for 10 minutes. The mixture was rapidly cooled to room temperature and pulverized into fine powder.

EXAMPLE 2

Preparation of the Ceramic Composition

Strontium carbonate ($SrCO_3$) and titanium oxide ($TiO_2$), each having a purity of not less than 99%, were mixed with the $Bi_2O_3$-$WO_3$ frit powder prepared in Example 1, in an MC-nylon jar for 24 hours, in amounts set forth in Table 1. Distilled water was used as a dispersing medium. The well mixed slurry was dried and molded under a pressure of 1,500 kg/cm$_2$ using a disk mold.

Thereafter, the molded specimens were sintered at a temperature of 1,400 to 1,470° C for 4 hours under a reducing atmosphere of $H_2$:$N_2$=10:100 [sccm].

The sintered specimens were then subjected to secondary thermal treatment at 1,250° C for 2 hours, using $PbO$-$Bi_2O_3$-$B_2O_3$, an insulating material.

TABLE 1

Composition and Properties of Specimens.

| Sample No. | Composition $Sr_{1-2x}Bi_xTi_{1-y}W_yO_3$ | | Sinter Temp. (°C.) | Dielec. Const.* (at 25° C.) | Properties Dielec. Loss (%) | ISR** ($\Omega$ – cm) | 2nd Thermal Treatment# |
|---|---|---|---|---|---|---|---|
| | x | y | | | | | |
| 1 | 0.0005 | 0.0015 | 1470 | 30,000 | 3 | $1 \times 10^{11}$ | 2 hr. |
| 2 | 0.001 | 0.003 | 1470 | 50,000 | 0.5 | $3 \times 10^{10}$ | 2 hr. |
| 3 | 0.001 | 0.003 | 1450 | 50,000 | 0.5 | $3 \times 10^{10}$ | 2 hr. |
| 4 | 0.002 | 0.006 | 1470 | 60,000 | 0.4 | $2 \times 10^{10}$ | 2 hr. |
| 5 | 0.002 | 0.006 | 1450 | 60,000 | 0.3 | $2 \times 10^{10}$ | 2 hr. |
| 6 | 0.002 | 0.006 | 1440 | 60,000 | 0.4 | $2 \times 10^{10}$ | 2 hr. |
| 7 | 0.003 | 0.009 | 1470 | 50,000 | 0.6 | $1 \times 10^{10}$ | 2 hr. |
| 8 | 0.003 | 0.009 | 1450 | 50,000 | 0.6 | $1 \times 10^{10}$ | 2 hr. |

*when applying 1 KHz.
**Insulation Specific Resistance at DC 25 V
at 1250° C.

Other features, advantages and embodiments of the invention disclosed herein will be readily apparent to those exercising ordinary skill in the art after reading the foregoing disclosure. In this regard, while specific embodiments of the invention have been described in considerable detail, variations and modifications of these embodiments can be effected without departing from the spirit and scope of the present invention as described and claimed.

What is claimed is:

1. A dielectric ceramic composition for boundary layer condensers, having the following empirical formula:

$$Sr_{1-2x}Bi_xTi_{1-y}W_yO_3$$

wherein x is in a range of 0.0005 to 0.003; and y is in a range of 0.0015 to 0.009.

2. A method for the preparation of a dielectric ceramic composition for boundary condensers, comprising the steps of:

mixing $Bi_2O_3$-$WO_3$ frit powder with the main component having an empirical formula $Sr_{1-2x}Ti_{1-y}O_3$ wherein x is in a range of 0.0005 to 0.003 and y is in a range of 0.0015 to 0.009, in a slurry;

drying the resulting mixture;

sintering the dried mixture at a temperature of 1,400 to 1,470° C under a reducing atmosphere; and applying secondary thermal treatment to the sintered body at 1,250° C.

3. A method set forth as claim 2, wherein said $Bi_2O_3$-$WO_3$ frit is prepared by mixing powdery $Bi_2O_3$ with powdery $WO_3$ in the mole ratio of $Bi_2O_3$ to $WO_3$ being 1:3; melting the mixture; rapidly cooling the melted mixture and pulverizing the cooled mixture into fine powder.

* * * * *